US012612315B2

(12) United States Patent
Zhao et al.

(10) Patent No.: US 12,612,315 B2
(45) Date of Patent: Apr. 28, 2026

(54) MULTI-ELEMENT CATHODE MATERIAL AND PREPARATION METHOD THEREOF, LITHIUM-ION BATTERY

(71) Applicants: BEIJING EASPRING MATERIAL TECHNOLOGY CO., LTD., Beijing (CN); EASPRING TECHNOLOGY (CHANGZHOU) NEW MATERIAL CO., LTD, Changzhou (CN); JIANGSU EASPRING MATERIAL TECHNOLOGY CO., LTD., Nantong (CN)

(72) Inventors: Tianmeng Zhao, Beijing (CN); Shunlin Song, Beijing (CN); Yafei Liu, Beijing (CN); Yanbin Chen, Beijing (CN)

(73) Assignees: BEIJING EASPRING MATERIAL TECHNOLOGY CO., LTD., Beijing (CN); EASPRING TECHNOLOGY (CHANGZHOU) NEW MATERIAL CO., LTD, Changzhou (CN); JIANGSU EASPRING MATERIAL TECHNOLOGY CO., LTD., Nantong (CN)

( * ) Notice: Subject to any disclaimer, the term of this patent is extended or adjusted under 35 U.S.C. 154(b) by 107 days.

(21) Appl. No.: 18/900,979

(22) Filed: Sep. 30, 2024

(65) Prior Publication Data

US 2025/0019259 A1 Jan. 16, 2025

Related U.S. Application Data

(63) Continuation of application No. PCT/CN2023/088747, filed on Apr. 17, 2023.

(51) Int. Cl.
*C01G 53/50* (2025.01)
*H01M 4/02* (2006.01)
(Continued)

(52) U.S. Cl.
CPC ............ *C01G 53/50* (2013.01); *H01M 4/366* (2013.01); *H01M 4/485* (2013.01); *H01M 4/505* (2013.01);
(Continued)

(58) Field of Classification Search
CPC ...... H01M 4/0471; H01M 4/366; H01M 4/48; H01M 4/485; H01M 4/505; H01M 4/525;
(Continued)

(56) References Cited

U.S. PATENT DOCUMENTS

2016/0254546 A1* 9/2016 Kwak .................. H01M 4/628
429/223
2018/0287152 A1 10/2018 Yasumiishi et al.
(Continued)

FOREIGN PATENT DOCUMENTS

CN 101478044 A 7/2009
CN 109742336 A 5/2019
(Continued)

OTHER PUBLICATIONS

English translation of CN Publication 115347168, Nov. 2022.*
(Continued)

*Primary Examiner* — Brittany L Raymond

(57) ABSTRACT

The present application relates to the technical field of lithium-ion battery and discloses a multi-element cathode material and, a preparation method thereof, and a lithium-ion battery. A surface of the multi-element cathode material includes a dot-like coating and/or an island-like coating. A particle diameter $D_1$ with 1% cumulative particle size distribution of the multi-element cathode material is greater than or equal to 0.7 μm. An arithmetic average roughness Ra, measured with a three-dimensional scanning electron microscope, of the coating of the multi-element cathode material satisfies 20 nm≤Ra≤200 nm. A coverage Q of the
(Continued)

dot-like coating and/or the island-like coating of the multi-element cathode material satisfies $3\% \le Q \le 30\%$. The surface of the multi-element cathode material contains the dot-like coating and/or the island-like coating, and the coating has specific arithmetic average roughness and coverage. Moreover, the multi-element cathode material has a relatively great particle size distribution $D_1$.

17 Claims, 3 Drawing Sheets

(51) Int. Cl.

| | |
|---|---|
| *H01M 4/36* | (2006.01) |
| *H01M 4/485* | (2010.01) |
| *H01M 4/505* | (2010.01) |
| *H01M 4/525* | (2010.01) |
| *H01M 10/0525* | (2010.01) |

(52) U.S. Cl.
CPC ....... *H01M 4/525* (2013.01); *H01M 10/0525* (2013.01); *C01P 2004/03* (2013.01); *C01P 2004/51* (2013.01); *C01P 2004/61* (2013.01); *C01P 2006/40* (2013.01); *H01M 2004/028* (2013.01)

(58) Field of Classification Search
CPC .............. H01M 2004/028; C01G 53/50; C01P 2004/03; C01P 2004/51; C01P 2004/61

See application file for complete search history.

(56) References Cited

U.S. PATENT DOCUMENTS

| | | | |
|---|---|---|---|
| 2019/0044135 A1* | 2/2019 | Du | H01M 4/621 |
| 2022/0077464 A1 | 3/2022 | Du et al. | |

FOREIGN PATENT DOCUMENTS

| | | | |
|---|---|---|---|
| CN | 112968150 A | | 6/2021 |
| CN | 113839013 A | | 12/2021 |
| CN | 115347168 | * | 11/2022 |
| CN | 115347168 A | | 11/2022 |
| CN | 115863638 A | | 3/2023 |
| JP | 2018523277 A | | 8/2018 |
| JP | 2018170187 A | | 11/2018 |
| JP | 2022166095 A | | 11/2022 |
| KR | 101632887 B1 | | 6/2016 |
| WO | 0079621 A1 | | 12/2000 |
| WO | 2022211507 A1 | | 10/2022 |
| WO | 2022265258 A1 | | 12/2022 |

OTHER PUBLICATIONS

International Search Report dated Dec. 11, 2023 in International Application No. PCT/CN2023/088747. English translation attached.
Written Opinion of the ISA dated Dec. 11, 2023 in International Application No. PCT/CN2023/088747. English translation attached.
Extended European Search Report dated Oct. 24, 2025 received in corresponding European Application No. EP23927833.6.
Notice of Reasons for Refusal dated Apr. 15, 2025 received in corresponding patent family application No. JP2024559049. English translation attached.
Decision to Grant a Patent dated Jul. 1, 2025 received in corresponding patent family application No. JP2024559049. English translation attached.

* cited by examiner

MULTI-ELEMENT CATHODE MATERIAL AND PREPARATION METHOD THEREOF, LITHIUM-ION BATTERY

CROSS-REFERENCE TO RELATED APPLICATION

The present application is a continuation of International Application No. PCT/CN2023/088747, filed on Apr. 17, 2023, the disclosure of which is hereby incorporated by reference in entirety.

FIELD

The present disclosure relates to the technical field of lithium-ion batteries, and particularly, to a multi-element cathode material, a preparation method thereof, and a lithium-ion battery.

BACKGROUND

In recent years, lithium-ion batteries have been widely applied in portable electronic devices, electric vehicles, and energy storage systems due to their high energy density.

Despite the wide application of lithium-ion batteries, the electric vehicles currently still cannot meet needs of consumers as compared with fuel vehicles, primarily due to problems of the electric vehicles, for example, in terms of limited endurance mileage, poor low-temperature performance, and safety.

A cathode material is a primary aspect restricting performance of the lithium-ion batteries. An energy density of a graphite negative electrode can reach 360 mAh/g, while an energy density of a cathode material, for example, a ternary 622 material, is only 180 mAh/g. In addition, the cathode material is the most expensive and heaviest main component of the lithium-ion batteries. Therefore, an improvement in the energy density of the cathode material and cycle stability can effectively reduce a weight and a price of the electric vehicles.

SUMMARY

In a first aspect, the present disclosure provides a multi-element cathode material. A surface of the multi-element cathode material includes a dot-like coating and/or an island-like coating. A particle diameter $D_1$ with 1% cumulative particle size distribution of the multi-element cathode material is greater than or equal to 0.7 μm. An arithmetic average roughness Ra, measured with a three-dimensional scanning electron microscope, of the coating of the multi-element cathode material satisfies 20 nm≤Ra≤200 nm. A coverage Q of the dot-like coating and/or the island-like coating of the multi-element cathode material satisfies 3%≤Q≤30%.

In a second aspect, the present disclosure provides a method for preparing a multi-electrode positive material. The method includes:

(1) mixing a multi-element cathode material precursor, a first lithium source, and an optional dopant, and performing first high-temperature sintering on the mixture, to obtain a multi-element cathode material process product 1;

(2) coarsely crushing the multi-element cathode material process product 1, and sequentially performing acid solution rinsing, water rinsing, and drying on the coarsely crushed multi-element cathode material process product 1, to obtain a multi-element cathode material process product 2; and (3) mixing the multi-element cathode material process product 2, an optional second lithium source, and a coating agent, and performing second high-temperature sintering and sieving on the mixture, to obtain the multi-element cathode material. Conditions of the acid solution rinsing include: a concentration of an acid solution ranges from 0.01 g/mL to 0.05 g/mL, and a rinsing duration ranges from 1 second to 120 seconds. A sintering temperature $T_2$ of the second high-temperature sintering ranges from 200° C. to 1,000° C. A matrix of the multi-element cathode material has a composition represented by a formula I: $Li_aNi_xMn_yCo_zM_bO_2$ formula I, where 0.9≤a≤1.1, 0.5≤x<1, 0<y<0.5, 0<z<0.5, and 0≤b≤0.02. A coating of the multi-element cathode material includes a lithium oxide compound containing an element J and/or an oxide containing the element J, and an amount of the coating agent is added based on a stoichiometric ratio of 0<[n(J)]/[n(Ni)+n(Co)+n(Mn)]≤0.03.

In a third aspect, the present disclosure provides a multi-element cathode material prepared by the above method.

In a fourth aspect, the present disclosure provides a lithium-ion battery. The lithium-ion battery includes the above multi-element cathode material.

DETAILED DESCRIPTION

Figure 1:
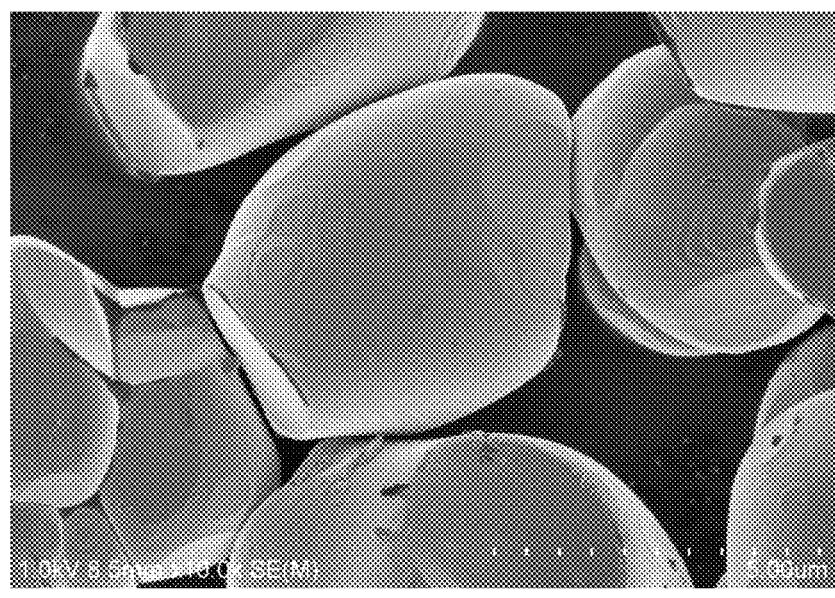
FIG. 1 is a Scanning Electron Microscope (SEM) image of a multi-element cathode material process product 2 prepared in Example 1.

Endpoint values and any values of ranges disclosed in the present disclosure are not limited to the precise ranges or values, and these ranges or values should be understood to include values close to these ranges or values. For numerical ranges, one or more new numerical ranges can be obtained by combining int values of the respective ranges, an end-point value and an individual point value of the respective ranges, and the individual point values, and these numerical ranges should be regarded as specifically disclosed in the present disclosure.

In order to overcome problems that capacity and cycle performance of a cathode material of a lithium-ion battery in the related art cannot meet actual needs, objects of the present disclosure are to provide a multi-element cathode material, a preparation method thereof, and a lithium-ion battery. A surface of the multi-element cathode material contains a dot-like coating and/or the island-like coating, and the coating has specific arithmetic average roughness and coverage. Moreover, the multi-element cathode material has a relatively great particle size distribution $D_1$, thereby reducing a content of micro-powders in the multi-element cathode material. In this way, the lithium-ion battery containing the cathode material has excellent capacity and cycle performance.

A first aspect of the present disclosure provides a multi-element cathode material. A surface of the multi-element cathode material includes a dot-like coating and/or an island-like coating.

A particle diameter $D_1$ with 1% cumulative particle size distribution of the multi-element cathode material is greater than or equal to 0.7 μm.

An arithmetic average roughness Ra, measured with a three-dimensional scanning electron microscope, of the coating of the multi-element cathode material satisfies 20 nm≤Ra≤200 nm.

A coverage Q of the dot-like coating and/or the island-like coating of the multi-element cathode material satisfies 3%≤Q≤30%.

In the related art, most of the multi-element cathode materials are hard blocks with serious inter-particle agglomeration. After strong dissociation, the multi-element cathode materials are prone to form micro-powders that remains on the surface of a multi-component positive electrode or is mixed in the multi-element cathode material. During battery manufacturing, the micro-powders may lead to poor slurry dispersibility and uneven coating. Moreover, the micro-powders consume more electrolyte, thereby affecting cycle performance and storage performance of a lithium-ion battery.

In the present disclosure, the multi-element cathode material has a relatively great particle size distribution $D_1$, indicating that the multi-element cathode material has fewer particles with small particle diameters and thus has a low content of micro-powders in the multi-element cathode material, such that a lithium-ion battery containing the cathode material has excellent capacity and cycle performance.

Further, the coating of the surface of the cathode material can significantly improve structural stability of the material. In the related art, in order to improve the cycle performance and the storage performance of the lithium-ion battery, most research focuses on an impact of coating element types on the material. However, the Applicant found through research that a coating amount and a coating state of the coating of the surface of the multi-element cathode material also have a very important influence on the multi-element cathode material. Specifically, when the dot-like coating and/or the island-like coating contained in the surface of the multi-element cathode material have the arithmetic average roughness and coverage as defined in the present disclosure, the lithium-ion battery prepared by the multi-element cathode material has more excellent electrical performance.

Furthermore, in the present disclosure, as the multi-element cathode material has a low content of the micro-powders, the coating can be prevented from being adsorbed by excessive micro-powders, avoiding a reduction in an effective coating effect, thereby avoiding a reduction in the capacity of the lithium-ion battery containing the multi-component cathode material. Meanwhile, in the present disclosure, as the multi-element cathode material has the low content of the micro-powders, the lithium-ion battery prepared by the multi-element cathode material has the excellent cycle performance and capacity with a reduced usage amount of a coating agent.

In the present disclosure, the arithmetic average roughness of the surface of the coating of the multi-element cathode material is measured with a three-dimensional scanning electron microscope (3D-SEM), and the arithmetic average roughness Ra of the surface of the particles is measured based on a method according to JIS B 0601 (2001). The coverage of the coating is calculated by dividing a total area of the dot-like coating and/or the island-like coating within a 1 μm² region of a single particle surface under the electron microscope by an area of the 1 μm² region. As the region indicated by the box in FIG. 2, regions of 300 different particles are selected to calculate an average value.

In a preferred embodiment of the present disclosure, the particle diameter $D_1$ with 1% cumulative particle size distribution of the multi-element cathode material satisfies 1 μm≤$D_1$≤2 μm; the arithmetic average roughness Ra, measured with the three-dimensional scanning electron microscope, of the coating of the multi-element cathode material satisfies 30 nm≤Ra≤100 nm; and the coverage Q of the dot-like coating and/or the island-like coating of the multi-element cathode material satisfies 5%≤Q≤15%.

According to the present disclosure, a particle diameter $D_{50}$ with 50% cumulative particle size distribution of the multi-element cathode material ranges from 2 μm to 8 μm, and preferably, from 2.5 μm to 7 μm.

In the present disclosure, the particle diameter $D_1$ with 1% cumulative particle size distribution of the multi-element cathode material and the particle diameter $D_{50}$ with 50% cumulative particle size distribution of the multi-element cathode material are measured with a laser particle size analyzer.

According to the present disclosure, an average size $P_{50}$ of primary particles, measured with an SEM, of the multi-element cathode material ranges from 0.8 μm to 6 μm, and preferably, from 1 μm to 4 μm.

According to the present disclosure, a specific surface area S of the multi-element cathode material satisfies: 0.2 m²/g≤S≤1.2 m²/g, and/or 1/$P_{50}$−0.1≤S≤1/$P_{50}$+0.2.

In the present disclosure, $P_{50}$ is expressed in units of μm, S is expressed in in units of m²/g, and the above relations are only a numerical relation.

In the present disclosure, the multi-element cathode material has a relatively great particle size distribution $D_1$ and a relatively small specific surface area S, and the specific surface area decreases with an increase in the average size $P_{50}$ of the primary particles. The specific surface area S has an obvious correlation with the average size $P_{50}$ of the primary particles, which establishes a relation between a macroscopic indicator and a microscopic particle size. In particular, when the specific surface area S of the multi-element cathode material satisfies both 0.2 m²/g≤S≤1.2 m²/g and 1/$P_{50}$−0.1≤S≤1/$P_{50}$+0.2, it indicates that a suitable dissociation condition and a suitable coating and back-sintering condition are used in the process of preparing the cathode material. In this regard, the multi-element cathode material provided by the present disclosure neither generates micro-powders through excessive dissociation, nor results in significant agglomeration caused by insufficient dissociation. If the particle size distribution $D_1$ is excessively small (i.e., a high content of micro-powders), the specific surface area S of the multi-element cathode material may be excessively great. If an insufficient dissociation leads to excessive agglomeration, the specific surface area S of the multi-element cathode material may be relatively small, such that a good arithmetic relation between the specific surface area S and the average size $P_{50}$ of the primary particles cannot be established.

In the present disclosure, further, the surface coating also affects the specific surface area of the material. Too much residual surface coating leads to a relatively great specific surface area, whereas too little residual surface coating results in a relatively small specific surface area. Only when the residual surface coating falls within an appropriate range and the above-mentioned relations are satisfied, the multi-element cathode material can have better electrochemical performance.

Further, the specific surface area S of the multi-element cathode material satisfies: $0.3 \text{ m}^2/\text{g} \leq S \leq 1 \text{ m}^2/\text{g}$, and/or $1/P_{50}-0.05 \leq S \leq 1/P_{50}+0.05$.

In a preferred embodiment of the present disclosure, the specific surface area S of the multi-element cathode material satisfies: $0.2 \text{ m}^2/\text{g} \leq S \leq 1.2 \text{ m}^2/\text{g}$ and $1/P_{50}-0.1 \leq S \leq 1/P_{50}+0.2$; and preferably, $0.3 \text{ m}^2/\text{g} \leq S \leq 1 \text{ m}^2/\text{g}$ and $1/P_{50}-0.05 \leq S \leq 1/P_{50}+0.05$.

According to the present disclosure, the multi-element cathode material is particles of a spherical shape and/or an ellipsoidal shape.

According to the present disclosure, a matrix of the multi-element cathode material has a composition represented by a formula I:

$$Li_aNi_xMn_yCo_zM_bO_2 \qquad \text{the formula I, where:}$$

$0.9 \leq a \leq 1.1$, $0.5 \leq x < 1$, $0 < y < 0.5$, $0 < z < 0.5$, and $0 \leq b \leq 0.02$; and the coating includes a lithium oxide compound containing an element J and/or an oxide containing the element J, contents of the matrix and the coating enable the cathode material to satisfying $0 < [n(J)]/[n(Ni)+n(Co)+n(Mn)] \leq 0.03$, and M and J being each independently selected from at least one element of Ba, Ra, Zr, Fe, Ca, Zn, B, W, Nb, Cd, Pb, Si, Mo, Cu, V, Ta, Cr, La, Al, Ce, Er, Ho, Y, Mg, Sr, and Ti.

In the present disclosure, the lithium oxide compound containing the element J and/or the oxide containing the element J may further include at least one element of Ni, Co, Mn, and M from the matrix.

Further, $1 \leq a \leq 1.06$, $0.6 \leq x < 1$, $0 \leq y \leq 0.4$, $0 \leq z \leq 0.4$, and $0.001 \leq b \leq 0.01$; the contents of the matrix and the coating enable the cathode material to satisfy $0.001 \leq [n(J)]/[n(Ni)+n(Co)+n(Mn)] \leq 0.01$; and M and J are each independently selected from at least one element of Ba, Zr, B, W, Nb, La, Al, Y, Mg, Sr and Ti.

A second aspect of the present disclosure provides a method for preparing a multi-element cathode material. The method includes:

(1) mixing a multi-element cathode material precursor, a first lithium source, and an optional dopant, and performing first high-temperature sintering on the mixture to obtain a multi-element cathode material process product 1;

(2) coarsely crushing the multi-element cathode material process product 1, and sequentially performing acid solution rinsing, water rinsing, and drying on the coarsely crushed multi-element cathode material process product 1, to obtain a multi-element cathode material process product 2; and (3) mixing the multi-element cathode material process product 2, an optional second lithium source, and a coating agent, and performing second high-temperature sintering and sieving on the mixture, to obtain the multi-element cathode material, in which conditions of the acid solution rinsing include: a concentration of an acid solution ranging from 0.01 g/mL to 0.05 g/mL, and a rinsing duration ranging from 1 second to 120 seconds; a sintering temperature $T_2$ of the second high-temperature sintering ranges from 200° C. to 1,000° C.;

and an amount of the coating agent is added based on a stoichiometric ratio of $0 < [n(J)]/[n(Ni)+n(Co)+n(Mn)] \leq 0.03$.

In the related art, due to the relatively high primary sintering temperature during the preparation of the multi-element cathode material, the multi-element cathode material is prone to form a hard block with the serious inter-particle agglomeration after the sintering, which is required to be dissociated using a strong dissociation method. The strong dissociation method may likely generate the micro-powders.

In the method for preparing the multi-element cathode material according to the present disclosure, the multi-element cathode material process product 1 obtained by the first high-temperature sintering can be dissociated by performing the acid solution rinsing with a good dissociation effect, without generating micro-powders. In this way, the generation of a large number of micro-powders caused by the conventional strong dissociation method can be avoided. Thus, poor slurry dispersibility and uneven coating as well as consumption of an electrolyte, which are caused by the excessive micro-powders, can be prevented, thereby preventing a reduction in the cycle performance and storage performance of the lithium-ion battery.

Further, a surface of the multi-element cathode material process product 1 may be corroded by the acid solution rinsing, thereby increasing roughness of a surface of the multi-element cathode material process product 2. Meanwhile, no particles are attached to the surface of the multi-element cathode material process product 2, enabling the coating to be more closely bonded to the surface of the prepared multi-element cathode material after the multi-element cathode material process product 2 and the coating agent are mixed and subjected to the second high-temperature sintering. In addition, during a cycling of the lithium-ion battery, the coating is not easy to fall off from the surface of the cathode material, thereby having better coating effect. Specifically, by controlling the conditions of the acid solution rinsing to meet the above-mentioned ranges, the particles of the prepared multi-element cathode material can be separated from each other without generating micro-powders. More specifically, when the concentration of the acid solution is excessively low or the rinsing duration is excessively short, the separation effect cannot be achieved. When the concentration of the acid solution is excessively high or the rinsing duration is excessively long, the structure of the surface of the multi-element cathode material is destroyed, eventually degrading the performance of the lithium-ion battery containing the multi-element cathode material.

Furthermore, in the present disclosure, by performing the acid solution rinsing on the multi-element cathode material process product 1 to reduce the content of the micro-powders of the multi-element cathode material, the lithium-ion battery prepared by the multi-element cathode material according to the present disclosure can be ensured to have excellent cycle performance and the high capacity while reducing the amount of the added coating agent.

In the present disclosure, the multi-element cathode material process product 2 is of independent particles of a spherical shape and/or an ellipsoidal shape.

Furthermore, lithium carbonate and lithium hydroxide residual on the surface of the multi-element cathode material process product 1 can be washed away by performing the acid solution rinsing, resulting in a reduction in the residual lithium on the surface of the prepared multi-element cathode material, and thus lack of lithium is likely to occur on the surface layer. Thus, the second lithium source is added during the second high-temperature sintering to ensure that the lithium-ion battery containing the prepared multi-element cathode material has a high capacity. Furthermore, the second lithium source serves as a flux. Thus, by adding the second lithium source during the second high-temperature sintering, the temperature of the second high-temperature sintering can be lowered, and energy consumption can be reduced.

According to the present disclosure, the multi-element cathode material precursor is a ternary nickel-cobalt-manganese cathode material precursor.

In the present disclosure, the multi-element cathode material precursor can be commercially available or self-made.

According to the present disclosure, the first lithium source and the second lithium source are each independently selected from one of lithium carbonate, lithium hydroxide, lithium oxide compound, and lithium acetate.

According to the present disclosure, the dopant and the coating agent are each independently selected from one of carbonates, hydroxides, oxides, and acetates capable of providing at least one element of Ba, Ra, Zr, Fe, Ca, Zn, B, W, Nb, Cd, Pb, Si, Mo, Cu, V, Ta, Cr, La, Al, Ce, Er, Ho, Y, Mg, Sr, and Ti.

According to the present disclosure, the acid solution is selected from at least one of sulfuric acid, carbonic acid, acetic acid, and oxalic acid.

According to the present disclosure, a total amount of the first lithium source and the second lithium source is added based on stoichiometric ratio of $0.9 \leq [n(Li1)+n(Li2)]/[n(Ni)+n(Co)+n(Mn)] \leq 1.1$.

Further, the total amount of the first lithium source and the second lithium source is added based on a stoichiometric ratio of $1 \leq [n(Li1)+n(Li2)]/[n(Ni)+n(Co)+n(Mn)] \leq 1.06$.

In the present disclosure, there is no particular limitation on the respective amounts of the first lithium source and the second lithium source, as long as the total amount of the first lithium source and the second lithium source satisfies the above-mentioned ranges.

In a specific embodiment of the present disclosure, an amount of the first lithium source is added based on a stoichiometric ratio of $0.9 \leq [n(Li1)]/[n(Ni)+n(Co)+n(Mn)] \leq 1.05$, and an amount of the second lithium source is added stoichiometric ratio of $0 \leq [n(Li2)]/[n(Ni)+n(Co)+n(Mn)] \leq 0.05$.

In a preferred embodiment of the present disclosure, the amount of the first lithium source is added based on a stoichiometric ratio of $0.99 \leq [n(Li1)]/[n(Ni)+n(Co)+n(Mn)] \leq 1.05$, and the amount of the second lithium source is added stoichiometric ratio of $0.01 \leq [n(Li2)]/[n(Ni)+n(Co)+n(Mn)] \leq 0.01$.

According to the present disclosure, an amount of the dopant is added based on a stoichiometric ratio of $0 \leq [n(M)]/[n(Ni)+n(Co)+n(Mn)] \leq 0.02$, and preferably, $0 \leq [n(M)]/[n(Ni)+n(Co)+n(Mn)] \leq 0.01$.

According to the present disclosure, an amount of the coating agent is added based on a stoichiometric ratio of $0 < [n(J)]/[n(Ni)+n(Co)+n(Mn)] \leq 0.03$.

In the present disclosure, when the amount of coating agent is controlled to meet the above-mentioned ranges, it can ensure that the prepared multi-element cathode material has an appropriate content of the coating, thereby ensuring that the prepared multi-element cathode material has a stable structure without excessive residual coating on the surface. Specifically, when the amount of coating agent is excessively high, excessive residual coating is remained on the surface of the material and affects lithium ion transmission, resulting in lower capacity and rate performance of the lithium-ion battery containing the multi-element cathode material. When the amount of the coating agent is excessively low, the coating function cannot be exerted. In this case, during the cycle, the electrolyte can easily destroy the surface structure of the multi-element cathode material, resulting in a reduction in the performance of the lithium-ion battery containing the multi-element cathode material.

According to the present disclosure, an amount of the coating agent is added based on a stoichiometric ratio of $0.001 \leq [n(J)]/[n(Ni)+n(Co)+n(Mn)] \leq 0.01$.

According to the present disclosure, conditions of first high-temperature sintering include: a sintering temperature $T_1$ ranging from 700° C. to 1,200° C., a sintering duration ranging from 10 hours to 30 hours, and a sintering atmosphere of oxygen and/or air.

Further, the conditions of first high-temperature sintering include: the sintering temperature $T_1$ ranging from 700° C. to 1,050° C., the sintering duration ranging from 15 hours to 25 hours, and the sintering atmosphere of oxygen and/or the air.

According to the present disclosure, the conditions of the acid solution rinsing include: the concentration of the acid solution ranging from 0.02 g/mL to 0.04 g/mL, and the rinsing duration ranging from 5 seconds to 60 seconds.

In the present disclosure, the coarse crushing can be performed by conventional methods well known to those skilled in the art, for example, dissociation by a pair of rollers with a wide gap, aiming to decompose the large block into small blocks with weak dissociation strength and generate fewer micro-powders.

In the present disclosure, the operation of performing the water rinsing on the product after the acid solution rinsing is intended to remove residual acid solution.

According to the present disclosure, the sintering temperature of the second high-temperature sintering ranges from 300° C. to 900° C.

According to the present disclosure, a sintering duration of the second high-temperature sintering ranges from 5 hours to 20 hours, and preferably, from 6 hours to 15 hours.

According to the present disclosure, the second high-temperature sintering is performed in air and/or oxygen.

According to the present disclosure, the sintering temperature $T_2$ of the second high-temperature sintering ranges from 200° C. to 1,000° C., and the sintering temperature $T_2$ and a melting point $T_m$ of the coating agent satisfy a relation of $100 \times \ln T_m - 200 \leq T_2 \leq 100 \times \ln T_m + 100$.

In the present disclosure, it was found that the coating agent on the cathode material can have better coating effect by adjusting the sintering temperature of the second high-temperature sintering based on the type of the coating agent. Specifically, when the melting point of the coating agent and the sintering temperature of the second high-temperature sintering are controlled to satisfy the above-mentioned relation, the better coating effect can be obtained.

Further, the sintering temperature $T_2$ of the second high-temperature sintering ranges from 300° C. to 900° C., and the sintering temperature $T_2$ and the melting point $T_m$ of the coating agent satisfy a relation of $100 \times \ln T_m - 100 \leq T_2 \leq 100 \times \ln T_m + 50$.

A third aspect of the present disclosure provides a multi-element cathode material prepared by the above preparation method.

A fourth aspect of the present disclosure provides a lithium-ion battery. The lithium-ion battery includes the above-mentioned multi-element cathode material.

Through the above technical solutions, the multi-element cathode material, the preparation method thereof, and the lithium-ion battery according to the present disclosure obtain beneficial effects as follows.

The surface of the multi-element cathode material according to the present disclosure contains the dot-like coating and/or the island-like coating, and the coating has specific arithmetic average roughness and coverage. Moreover, the multi-element cathode material has a relatively great particle size distribution $D_1$, thereby reducing a content of micro-powders in the multi-element cathode material. In this way, the lithium-ion battery containing the cathode material has excellent capacity and excellent cycle performance.

In the method for preparing the multi-element cathode material according to the present disclosure, the multi-element cathode material process product 1 obtained by the first high-temperature sintering can be dissociated by performing the acid solution rinsing with a good dissociation effect, without generating micro-powders. In this way, a generation of a large number of micro-powders caused by a conventional strong dissociation method can be avoided. Thus, poor slurry dispersibility and uneven coating as well as consumption of an electrolyte, which are caused by the excessive micro-powders, can be prevented, thereby preventing a reduction in the cycle performance and storage performance of the lithium-ion battery.

The present disclosure is described in detail below by means of examples. In the following examples, all raw materials are commercially available unless otherwise specified.

Unless otherwise specified, the room temperature mentioned in the present disclosure refers to 25±2° C.

In the following examples and comparative examples, relevant parameters are tested by the following methods:

(1) Particle size testing: laser particle analyzer;

(2) Morphology and surface roughness testing: scanning electron microscope, model ERA-9200, manufactured by ELIONIX Co., Ltd., Japan;

(3) Specific surface area testing: specific surface area analyzer, model Tristar 3020, manufactured by Micromeritics Instrument Corporation; and (4) Electrochemical performance testing: in the following examples and comparative examples, the electrochemical performance of the multi-element cathode material was tested using a button cell of model 2050.

A process of preparing a button cell of model 2050 is as follows.

Preparation of plate: a uniform slurry was formed by fully mixing a multi-element cathode material, acetylene black, and polyvinylidene fluoride (PVDF) in a mass ratio of 95:3:2 with an appropriate amount of N-methyl pyrrolidone (NMP); and after the slurry was coated on an aluminum foil and dried at 120° C. for 12 hours, it was stamped with a pressure of 100 MPa into positive electrode plates having a diameter of 12 mm and a thickness of 120 μm. A loading quantity of the multi-element cathode material was 15 mg/cm².

Battery assembly: in an argon-filled air glove box with a water content and oxygen content of less than 5 ppm, the positive electrode plate, a separator, a negative electrode plate, and an electrolyte were assembled into a button cell of model 2050, which was left standing for 6 hours. A lithium sheet having a diameter of 17 mm and a thickness of 1 mm served as the negative electrode. A polyethylene porous film (Celgard2325) having a thickness of 25 μm served as the separator. The electrolyte was a mixture of equal amounts of ethylene carbonate (EC) and diethyl ethyl carbonate (DEC) containing 1 mol/LLiPF$_6$.

Electrochemical Performance Testing:

In the following examples and comparative examples, a battery testing system from Neware Technology Co., Ltd., was used to test electrochemical performance of the button cell of model 2050. Charge and discharge current density of 0.1 C was 200 mA/g.

Charge and discharge voltage was controlled to range from 3.0 V to 4.3 V. At the room temperature, the button cell was tested for charging and discharging at 0.1 C to evaluate first charge-discharge specific capacity and first charge-discharge efficiency of the multi-element cathode material.

Cycle performance testing: a charge and discharge voltage was controlled to range from 3.0 V to 4.3 V. At a constant temperature of 45° C., the button cell was charged and discharged for 2 cycles at 0.1 C and charged and discharged for 80 cycles at 1 C to evaluate high-temperature capacity retention rate of the multi-element cathode material.

Rate performance testing: the charge and discharge voltage was controlled to range from 3.0 V to 4.3 V. At the room temperature, the button cell was charged and discharged for 2 cycles at 0.1 C, and then charged and discharged for 1 cycle at 0.2 C, 0.33 C, 0.5 C, and 1 C respectively. Rate performance of the multi-element cathode material was evaluated by calculating a ratio of the first discharge specific capacity at 0.1 C to the discharge specific capacity at 1 C. The first discharge specific capacity at 0.1 C was the discharge specific capacity of the button cell in the first cycle, and the discharge specific capacity at 1 C is the discharge specific capacity of the button cell in the sixth cycle.

Example 1

This example is provided to explain the cathode material prepared by the method of the present disclosure.

(1) A nickel-cobalt-manganese hydroxide precursor $Ni_{0.8}Co_{0.1}Mn_{0.1}(OH)_2$, lithium hydroxide, and aluminum oxide were uniformly mixed based on a ratio of $n(Li):n(Al):[n(Ni)+n(Co)+n(Mn)]=1.04:0.001:1$, and the mixture was sintered at 890° C. for 20 hours in an oxygen atmosphere and naturally cooled to the room temperature, to obtain a multi-element cathode material process product 1.

(2) The multi-element cathode material process product 1 was coarsely crushed, and then the coarsely crushed multi-element cathode material process product 1 was rinsed with 0.03 g/mL sulfuric acid for 30 seconds, rinsed with deionized water to remove the residual sulfuric acid, and dried, to obtain a multi-element cathode material process product 2: $Li_{1.04}Ni_{0.8}Co_{0.1}Mn_{0.1}Al_{0.001}O_2$.

(3) The multi-element cathode material process product 2, lithium hydroxide, magnesium oxide, and tungsten oxide were uniformly mixed based on a ratio of $n(Li):n(Mg):n(W):[n(Ni)+n(Co)+n(Mn)]=0.01:0.005:0.002:1$, sintered at 700° C. for 12 hours in an oxygen atmosphere, naturally cooled to the room temperature, and sieved, to obtain a multi-element cathode material.

Example 2 to Example 7

Example 2 to Example 7 adopted the method as described in Example 1. Example 2 to Example 7 differed Example 1 in the formula and the process parameters used, which are specifically listed in Table 1, and the other aspects were the same as Example 1, to prepare multi-element cathode materials.

TABLE 1

| | Example 1 | Example 2 | Example 3 | Example 4 |
|---|---|---|---|---|
| Precursor composition | $Ni_{0.8}Co_{0.1}Mn_{0.1}(OH)_2$ | $Ni_{0.8}Co_{0.1}Mn_{0.1}(OH)_2$ | $Ni_{0.8}Co_{0.1}Mn_{0.1}(OH)_2$ | $Ni_{0.8}Co_{0.1}Mn_{0.1}(OH)_2$ |
| First lithium source | Lithium hydroxide | Lithium hydroxide | Lithium hydroxide | Lithium hydroxide |
| $Li_1$/(Ni + Mn + Co) | 1.04 | 1.04 | 1.04 | 1.04 |
| Dopant | $Al_2O_3$ | $Al_2O_3$ | $Al_2O_3$ | $Al_2O_3$ |
| Molar ratio of dopant | Al/(Ni + Mn + Co) = 0.001:1 | Al/(Ni + Mn + Co) = 0.001:1 | Al/(Ni + Mn + Co) = 0.001:1 | Al/(Ni + Mn + Co) = 0.001:1 |
| First high-temperature sintering temperature/° C. | 890 | 890 | 890 | 890 |
| First high-temperature sintering duration/h | 20 | 20 | 20 | 20 |
| Sulfuric acid concentration/g/mL | 0.03 | 0.01 | 0.05 | 0.03 |
| Rinsing duration/s | 30 | 5 | 90 | 30 |
| Second lithium source | Lithium hydroxide | Lithium hydroxide | Lithium hydroxide | Lithium hydroxide |
| $Li_2$/(Ni + Mn + Co) | 0.01 | 0.01 | 0.01 | 0.01 |
| Coating agent | $MgO, WO_3$ | $MgO, WO_3$ | $MgO, WO_3$ | $MgO, WO_3$ |
| Molar ratio of coating agent | Mg/(Ni + Mn + Co) = 0.005:1 W/(Ni + Mn + Co) = 0.002:1 | Mg/(Ni + Mn + Co) = 0.005:1 W/(Ni + Mn + Co) = 0.002:1 | Mg/(Ni + Mn + Co) = 0.005:1 W/(Ni + Mn + Co) = 0.002:1 | Mg/(Ni + Mn + Co) = 0.015:1 W/(Ni + Mn + Co) = 0.01:1 |
| Melting point of coating agent/° C. | 2,852, 1,473 | 2,852, 1,473 | 2,852, 1,473 | 2,852, 1,473 |
| Second high-temperature sintering temperature/° C. | 700 | 700 | 700 | 580 |
| Second high-temperature sintering duration/h | 12 | 12 | 12 | 12 |

| | Example 5 | Example 6 | Example 7 | Example 8 |
|---|---|---|---|---|
| Precursor composition | $Ni_{0.8}Co_{0.1}Mn_{0.1}(OH)_2$ | $Ni_{0.6}Co_{0.2}Mn_{0.2}(OH)_2$ | $Ni_{0.9}Co_{0.05}Mn_{0.05}(OH)_2$ | $Ni_{0.8}Co_{0.1}Mn_{0.1}(OH)_2$ |
| First lithium source | Lithium hydroxide | Lithium hydroxide | Lithium hydroxide | Lithium hydroxide |
| $Li_1$/(Ni + Mn + Co) | 1.04 | 1.04 | 1.04 | 1.04 |
| Dopant | $Al_2O_3$ | / | $La_2O_3$ | $Al_2O_3$ |
| Molar ratio of dopant | Al/(Ni + Mn + Co) = 0.001:1 | / | La/(Ni + Mn + Co) = 0.003:1 | Al/(Ni + Mn + Co) = 0.001:1 |
| First high-temperature sintering temperature/° C. | 890 | 980 | 850 | 890 |
| First high-temperature sintering duration/h | 20 | 20 | 20 | 20 |
| Sulfuric acid concentration/g/mL | 0.03 | 0.03 | 0.03 | 0.03 |
| Rinsing duration/s | 30 | 30 | 30 | 30 |
| Second lithium source | Lithium hydroxide | Lithium hydroxide | Lithium hydroxide | / |
| $Li_2$/(Ni + Mn + Co) | 0.01 | 0.01 | 0.01 | / |
| Coating agent | $MgO, WO_3$ | $ZrO_2$ | $Al_2O_3, TiO_2$ | $MgO, WO_3$ |
| Molar ratio of coating agent | Mg/(Ni + Mn + Co) = 0.005:1 W/(Ni + Mn + Co) = 0.002:1 | Zr/(Ni + Mn + Co) = 0.008:1 | Al/(Ni + Mn + Co) = 0.005:1 Ti/(Ni + Mn + Co) = 0.004:1 | Mg/(Ni + Mn + Co) = 0.005:1 W/(Ni + Mn + Co) = 0.002:1 |
| Melting point of coating agent/° C. | 2,852, 1,473 | 2,700 | 2,852, 1,840 | 2,852, 1,473 |
| Second high-temperature sintering temperature/° C. | 870 | 730 | 690 | 700 |
| Second high-temperature sintering duration/h | 12 | 12 | 12 | 12 |

Comparative Example 1

(1) A nickel-cobalt-manganese hydroxide precursor $Ni_{0.8}Co_{0.1}Mn_{0.1}(OH)_2$, lithium hydroxide, and aluminum oxide were uniformly mixed based on a ratio of n(Li):n(Al):[n(Ni)+n(Co)+n(Mn)]=1.04:0.001:1, and the mixture was sintered at 890° C. for 20 hours in an oxygen atmosphere and naturally cooled to the room temperature, to obtain a multi-element cathode material process product 1.

(2) The multi-element cathode material process product 1 was coarsely crushed, and then the coarsely crushed multi-element cathode material process product 1 was dissociated by a pair of rollers with a relatively narrow gap to a target particle size of 6.2 μm, to obtain a multi-element cathode material process product 2: $Li_{1.04}Ni_{0.8}Co_{0.1}Mn_{0.1}Al_{0.001}O_2$.

(3) The multi-element cathode material process product 2, lithium hydroxide, magnesium oxide, and tungsten oxide were uniformly mixed based on a ratio of n(Li):n(Mg):n(W):[n(Ni)+n(Co)+n(Mn)]=0.01:0.005:0.002:1, sintered at 700° C. for 12 hours in an oxygen atmosphere, naturally cooled to the room temperature, and sieved, to obtain a multi-element cathode material.

Comparative Example 2

Comparative Example 2 was based on the method of Example 1. Comparative Example 2 differed from Example 1 in step (3), in which the multi-element cathode material process product 2 and lithium hydroxide were uniformly mixed based on a ratio of n(Li):[n(Ni)+n(Co)+n(Mn)]=0.01: 1, and the other aspects were the same as Example 1, to obtain a multi-element cathode material:

$Li_{1.05}Ni_{0.8}Co_{0.1}Mn_{0.1}Al_{0.001}O_2$. Data of characteristic parameter testing are shown in Table 2.

Comparative Example 3

Comparative Example 3 was based on the method of Example 1. Comparative Example 3 differed from Example 1 in step (3), in which the ternary material process product 2, lithium hydroxide, magnesium oxide, and tungsten oxide were uniformly mixed based on a ratio of n(Li):n(Mg):n(W):[n(Ni)+n(Co)+n(Mn)]=0.01:0.03:0.03:1, and sintered at 400° C. for 12 hours in an oxygen atmosphere. The other aspects were the same as in Example 1. A multi-element cathode material was obtained. Data of characteristic parameter testing are shown in Table 2.

Comparative Example 4

Comparative Example 4 was based on the method of Example 1. Comparative Example 4 differed from Example 1 in step (3), in which the sintering was performed at 1,100° C. in an oxygen atmosphere; and the other aspects were the same as Example 1, to obtain a multi-element cathode material. Data of characteristic parameter testing are shown in Table 2.

Comparative Example 5

Comparative Example 5 was based on the method of Example 1. Comparative Example 5 differed from Example 1 in step (2), in which the rinsing was performed with 0.1 g/mL sulfuric acid for 180 s; and the other aspects were the same as Example 1, to obtain a multi-element cathode material. Data of characteristic parameter testing are shown in Table 2.

Testing Examples (1) Morphology Testing

Figure 2:
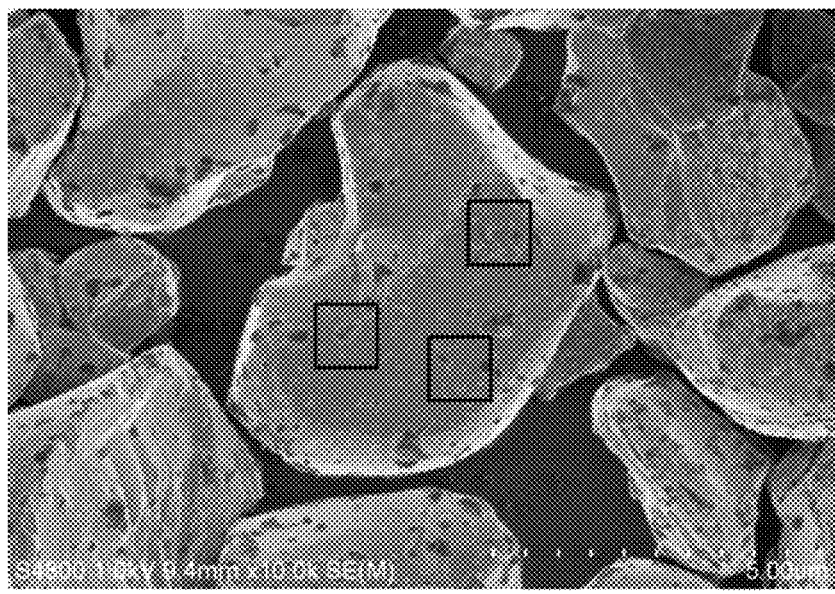
FIG. 2 is a SEM image of a multi-element cathode material prepared in Example 1, where a 1 μm² region selected for calculating coverage is marked with a box.

The present disclosure tested scanning electron microscope images of the cathode materials prepared in the above-mentioned examples and comparative examples and calculated an average size $P_{50}$ of primary particles, an arithmetic average roughness Ra, and a coverage Q of the multi-element cathode material, as shown in FIG. 1 to FIG. 4 and Table 2. FIG. 1 reveals that the surface of the multi-element cathode material process product 2 obtained in Example 1 had no agglomeration and had good particle independence. FIG. 2 reveals that the multi-element cathode material had the dot- and island-like coating on the surface thereof. The multi-element cathode material process product 2 obtained in Comparative Example 1 had more micro-powders on the surface thereof, more fragments, and the corners thereof were worn, and in addition to the coating, more micro-powders were present on the surface of the multi-element cathode material.

(2) Physical Property Testing

The present disclosure tested the $D_1$, $D_{50}$, $P_{50}$, S, Ra, and Q of the multi-element cathode materials prepared in the above-mentioned examples and comparative examples. The specific testing results are shown in Table 2.

TABLE 2

| | Matrix composition of cathode material | Coating | Content of coating |
|---|---|---|---|
| Example 1 | $Li_{1.05}Ni_{0.8}Co_{0.1}Mn_{0.1}Al_{0.001}O_2$ | Lithium oxide of Mg and/or oxide of Mg, and lithium oxide compound of W and/or oxide of W | $n(Mg)/[n(Ni) + n(Co) + n(Mn)] = 0.005$; $n(W)/[n(Ni) + n(Co) + n(Mn)] = 0.002$ |
| Example 2 | $Li_{1.05}Ni_{0.8}Co_{0.1}Mn_{0.1}Al_{0.001}O_2$ | Lithium oxide of Mg and/or oxide of Mg, and lithium oxide compound of W and/or oxide of W | $n(Mg)/[n(Ni) + n(Co) + n(Mn)] = 0.005$; $n(W)/[n(Ni) + n(Co) + n(Mn)] = 0.002$ |
| Example 3 | $Li_{1.05}Ni_{0.8}Co_{0.1}Mn_{0.1}Al_{0.001}O_2$ | Lithium oxide of Mg and/or oxide of Mg, and lithium oxide compound of W and/or oxide of W | $n(Mg)/[n(Ni) + n(Co) + n(Mn)] = 0.005$; $n(W)/[n(Ni) + n(Co) + n(Mn)] = 0.002$ |
| Example 4 | $Li_{1.05}Ni_{0.8}Co_{0.1}Mn_{0.1}Al_{0.001}O_2$ | Lithium oxide of Mg and/or oxide of Mg, and lithium oxide compound of W and/or oxide of W | $n(Mg)/[n(Ni) + n(Co) + n(Mn)] = 0.015$; $n(W)/[n(Ni) + n(Co) + n(Mn)] = 0.01$ |
| Example 5 | $Li_{1.05}Ni_{0.8}Co_{0.1}Mn_{0.1}Al_{0.001}O_2$ | Lithium oxide of Mg and/or oxide of Mg, and lithium oxide compound of W and/or oxide of W | $n(Mg)/[n(Ni) + n(Co) + n(Mn)] = 0.005$; $n(W)/[n(Ni) + n(Co) + n(Mn)] = 0.002$ |
| Example 6 | $Li_{1.05}Ni_{0.6}Co_{0.2}Mn_{0.2}O_2$ | Lithium oxide of Zr and/or oxide of Zr | $n(Zr)/[n(Ni) + n(Co) + n(Mn)] = 0.008$ |
| Example 7 | $Li_{1.05}Ni_{0.9}Co_{0.05}Mn_{0.05}La_{0.003}O_2$ | Lithium oxide of Al and/or oxide of Al, and lithium oxide compound of Ti and/or oxide of Ti | $n(Al)/[n(Ni) + n(Co) + n(Mn)] = 0.005$; $n(Ti)/[n(Ni) + n(Co) + n(Mn)] = 0.004$ |
| Example 8 | $Li_{1.04}Ni_{0.8}Co_{0.1}Mn_{0.1}Al_{0.001}O_2$ | Lithium oxide of Mg and/or oxide of Mg, and lithium oxide compound of W and/or oxide of W | $n(Mg)/[n(Ni) + n(Co) + n(Mn)] = 0.005$; $n(W)/[n(Ni) + n(Co) + n(Mn)] = 0.002$ |

TABLE 2-continued

| | Matrix composition of cathode material | Coating | Content of coating |
|---|---|---|---|
| Comparative Example 1 | $Li_{1.05}Ni_{0.8}Co_{0.1}Mn_{0.1}Al_{0.001}O_2$ | Lithium oxide of Mg and/or oxide of Mg, and lithium oxide compound of W and/or oxide of W | $n(Mg)/[n(Ni) + n(Co) + n(Mn)] = 0.005$; $n(W)/[n(Ni) + n(Co) + n(Mn)] = 0.002$ |
| Comparative Example 2 | $Li_{1.05}Ni_{0.8}Co_{0.1}Mn_{0.1}Al_{0.001}O_2$ | / | / |
| Comparative Example 3 | $Li_{1.05}Ni_{0.8}Co_{0.1}Mn_{0.1}Al_{0.001}O_2$ | Lithium oxide of Mg and/or oxide of Mg, and lithium oxide compound of W and/or oxide of W | $n(Mg)/[n(Ni) + n(Co) + n(Mn)] = 0.03$; $n(W)/[n(Ni) + n(Co) + n(Mn)] = 0.03$ |
| Comparative Example 4 | $Li_{1.05}Ni_{0.8}Co_{0.1}Mn_{0.1}Al_{0.001}O_2$ | Lithium oxide of Mg and/or oxide of Mg, and lithium oxide compound of W and/or oxide of W | $n(Mg)/[n(Ni) + n(Co) + n(Mn)] = 0.005$; $n(W)/[n(Ni) + n(Co) + n(Mn)] = 0.002$ |
| Comparative Example 5 | $Li_{1.05}Ni_{0.8}Co_{0.1}Mn_{0.1}Al_{0.001}O_2$ | Lithium oxide of Mg and/or oxide of Mg, and lithium oxide compound of W and/or oxide of W | $n(Mg)/[n(Ni) + n(Co) + n(Mn)] = 0.005$; $n(W)/[n(Ni) + n(Co) + n(Mn)] = 0.002$ |

TABLE 2

(continued)

| | $D_1$ μm | $D_{50}$ μm | $P_{50}$ μm | $1/P_{50}$ | $1/P_{50} - 0.1$ to $1/P_{50} + 0.2$ | S $m^2/g$ | Ra nm | Q % |
|---|---|---|---|---|---|---|---|---|
| Example 1 | 2.1 | 6.2 | 3.2 | 0.313 | 0.213-0.513 | 0.355 | 56 | 9 |
| Example 2 | 3.2 | 7.9 | 3.2 | 0.313 | 0.213-0.513 | 0.324 | 58 | 12 |
| Example 3 | 1.8 | 5.8 | 2.9 | 0.345 | 0.245-0.545 | 0.543 | 59 | 7 |
| Example 4 | 2.1 | 6.2 | 3.2 | 0.313 | 0.213-0.513 | 0.582 | 142 | 21 |
| Example 5 | 2.1 | 6.2 | 3.2 | 0.313 | 0.213-0.513 | 0.335 | 21 | 4 |
| Example 6 | 1.1 | 3.8 | 1.9 | 0.526 | 0.426-0.726 | 0.584 | 38 | 6 |
| Example 7 | 1.2 | 4.1 | 2.1 | 0.476 | 0.376-0.676 | 0.545 | 45 | 10 |
| Example 8 | 2.1 | 6.2 | 3.2 | 0.313 | 0.213-0.513 | 0.355 | 60 | 12 |
| Comparative Example 1 | 0.4 | 6.2 | 3.2 | 0.313 | 0.213-0.513 | 1.359 | 307 | 36 |
| Comparative example 2 | 2.1 | 6.2 | 3.2 | 0.313 | 0.213-0.513 | 0.192 | 0 | 0 |
| Comparative Example 3 | 2.1 | 6.2 | 3.2 | 0.313 | 0.213-0.513 | 0.782 | 242 | 39 |
| Comparative Example 4 | 2.1 | 6.2 | 3.2 | 0.313 | 0.213-0.513 | 0.187 | 0 | 0 |
| Comparative Example 5 | 1.2 | 2.6 | 1.8 | 0.556 | 0.456-0.756 | 0.782 | 42 | 2 |

It can be seen from Table 2 that, compared with Example 1, in Example 2, the concentration of the sulfuric acid was lower, the rinsing duration was shorter, and the obtained S was smaller, indicating insufficient dissociation and particle agglomeration; and in Example 3, the concentration of the sulfuric acid was higher, the rinsing duration was longer, the obtained S was greater, and the obtained $D_{50}$ and $P_{50}$ were smaller, indicating that the surface of the cathode material was partially corroded by sulfuric acid.

Compared with Example 1, in Example 4, the coating amount was greater, the surface had more residual coating agents, and S, Ra, and Q were greater; and in Example 5, the temperature of the second-high temperature sintering was higher, more coating agents were incorporated into an outer layer of the cathode material, the surface had less residual coating, and S, Ra and Q were smaller.

Examples 6 and 7 indicate that different compositions and coating agents were also applicable.

Figure 3:
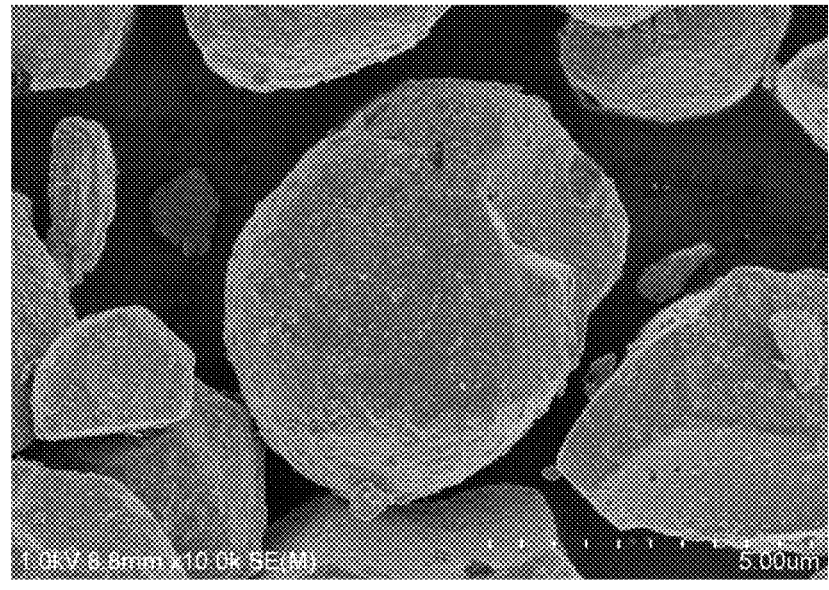
FIG. 3 is a SEM image of a multi-element cathode material process product 2 prepared in Comparative Example 1.
Figure 4:
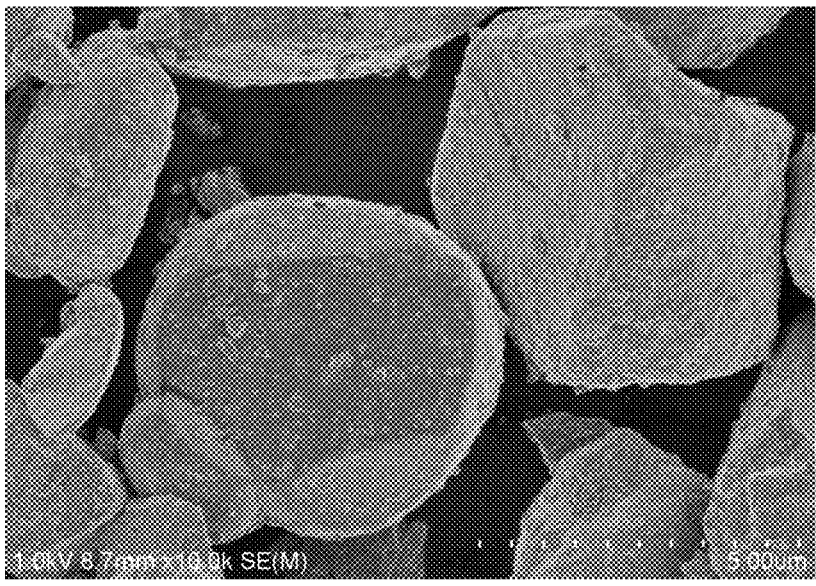
FIG. 4 is a SEM image of a multi-element cathode material prepared in Comparative Example 1.
Figure 5:
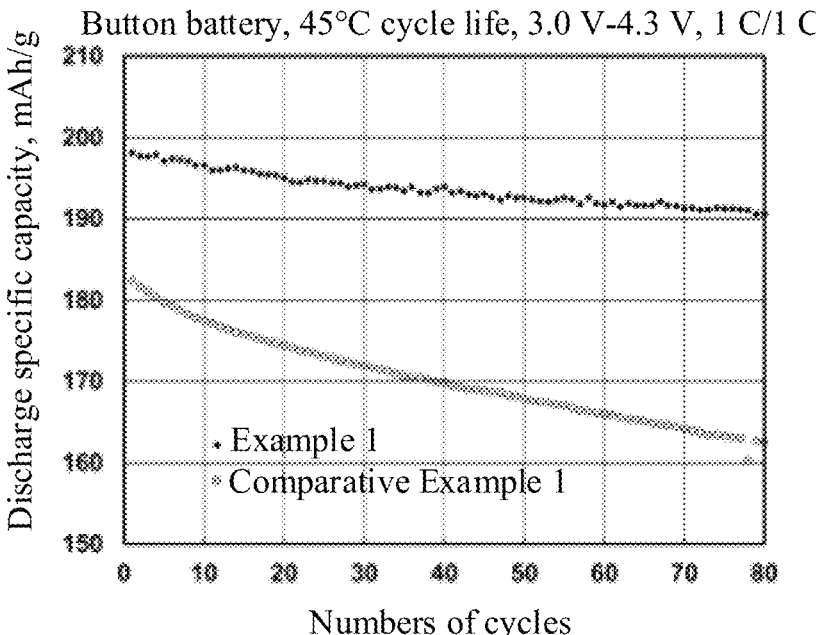
FIG. 5 is a cycle performance graph of cathode materials respectively prepared in Example 1 and Comparative Example 1 at a rate of 1 C, with a test temperature of 45° C. and a voltage ranging from 3 V to 4.3 V.

Compared with Example 1, the coarsely crushed multi-element cathode material process product 1 was dissociated to have the target particle size using the pair of rollers in Comparative Example 1, leading to more micro-powders, smaller $D_1$, greater S, and greater surface roughness Ra, which were consistent with the conclusions in FIG. 3 and FIG. 4.

In Comparative Example 2, no coating was performed, and the particles were slightly aggregated after the second high-temperature sintering, resulting in smaller S; in Comparative Example 3, the coating amount was excessively greater, and the second high-temperature sintering temperature was lower, resulting in more residual coating agents on the surface, excessively greater S, greater surface roughness Ra and surface coverage Q; and in Comparative Example 4, the temperature of the second high-temperature sintering was high, the coating agent was incorporated into the outer layer of the cathode material, and the particles were aggregated, resulting in a smaller S.

In Comparative Example 5, the concentration of the acid solution was relatively high, and the rinsing duration was long, leading to serious surface corrosion, smaller $D_{50}$ and $P_{50}$, and greater S.

TABLE 3

| | First discharge specific capacity (0.1 C/mAh/g) | Discharge specific capacity (1.0 C/mAh/g) | Rate 1.0 C/0.1 C | Capacity retention rate/% after 80 cycles at 45° C. |
|---|---|---|---|---|
| Example 1 | 202.5 | 186.2 | 0.920 | 96.2 |
| Example 2 | 201.7 | 184.2 | 0.913 | 95.3 |
| Example 3 | 201.6 | 184.5 | 0.915 | 94.8 |
| Example 4 | 199.3 | 181.2 | 0.909 | 93.2 |

TABLE 3-continued

| | First discharge specific capacity (0.1 C/mAh/g) | Discharge specific capacity (1.0 C/mAh/g) | Rate 1.0 C/0.1 C | Capacity retention rate/% after 80 cycles at 45° C. |
|---|---|---|---|---|
| Example 5 | 199.6 | 181.1 | 0.907 | 92.9 |
| Example 6 | 185.4 | 170.7 | 0.921 | 97.6 |
| Example 7 | 211.5 | 193.8 | 0.916 | 91.5 |
| Example 8 | 198.8 | 180.5 | 0.908 | 93.1 |
| Comparative Example 1 | 198.2 | 174.1 | 0.878 | 88.9 |
| Comparative Example 2 | 198.7 | 176.2 | 0.887 | 89.2 |
| Comparative Example 3 | 198.3 | 176.2 | 0.889 | 90.8 |
| Comparative Example 4 | 198.2 | 175.8 | 0.887 | 90.2 |
| Comparative Example 5 | 200.1 | 180.2 | 0.901 | 89.0 |

It can be seen from Table 3 that compared with Example 1, in Example 2, the S was smaller, the particles were aggregated, the material capacity was slightly lower, and the rate and the cycle performance were slightly poor; and in Example 3, the S was greater, the surface was partially corroded, and the cycle performance of the material was poor.

Compared with Example 1, in Example 4, the coating amount was greater and the surface had more residual coating agents, which hindered lithium ion transmission, thereby reducing the material capacity and resulting in poor rate and slightly poor cycle performance; and in Example 5, the temperature of the second high-temperature sintering was high, the surface had less coating agent, and the cycle performance was poor; and in Example 8, no second lithium source was omitted, the surface was deficient in lithium, and the capacity was low.

Compared with Example 1, in Comparative Example 1, more micro-powders were present to consume more electrolyte, leading to insufficient electrolyte, which may be reflected in a reduction in the capacity of the material. In addition, the micro-powders can cause instability of the electrode plate of the battery, and thus the cycle performance deteriorates.

In Comparative Example 2, the coating was omitted. Thus, during a charge and a discharge of the battery, the surface was prone to structural transformation and the cycle performance was poor. In Comparative Example 3, more surface residues hindered lithium ion transmission, and the rate of the material was poor. In Comparative Example 4, the temperature of the second high-temperature sintering was high, the residual coating agent was less, the particles were aggregated, and therefore, cycle stability of the material was poor.

In Comparative Example 5, the concentration of the acid solution was excessively high the rinsing duration was long, such that the material was severely corroded, leading to relatively poor cycle stability of the material.

The preferred embodiments of the present disclosure are described in detail above. However, the present disclosure is not limited thereto. Within the scope of the technical concept of the present disclosure, various simple modifications can be made to the technical solutions of the present disclosure, including the combination of various technical features in any other suitable manner. These simple modifications and combinations should also be regarded as the disclosed content of the present disclosure and fall within the protection scope of the present disclosure.

What is claimed is:

1. A multi-element cathode material, wherein:
   a surface of the multi-element cathode material comprises a dot-like coating and/or an island-like coating;
   a particle diameter $D_1$ with 1% cumulative particle size distribution of the multi-element cathode material is greater than or equal to 0.7 μm;
   an arithmetic average roughness Ra, measured with a three-dimensional scanning electron microscope, of the coating of the multi-element cathode material satisfies 20 nm≤Ra≤200 nm; and
   a coverage Q of the dot-like coating and/or the island-like coating of the multi-element cathode material satisfies 3%≤Q≤30%,
   a matrix of the cathode material has a composition represented by a formula I:

$$Li_aNi_xMn_yCo_zM_bO_2 \qquad \text{the formula I,}$$

where 0.9≤a≤1.1, 0.5≤x≤1, 0<y<0.5, 0<z<0.5, and 0≤b≤0.02;
   the coating comprises a lithium oxide compound containing an element J and/or an oxide containing the element J;
   wherein contents of the matrix and the coating enable the cathode material to satisfy 0<[n(J)]/[n(Ni)+n(Co)+n(Mn)]≤0.03; and
   wherein M and J are each independently selected from at least one element of Ba, Ra, Zr, Fe, Ca, Zn, B, W, Nb, Cd, Pb, Si, Mo, Cu, V, Ta, Cr, La, Al, Ce, Er, Ho, Y, Mg, Sr, and Ti.

2. The multi-element cathode material according to claim 1, wherein:
   the particle diameter $D_1$ with 1% cumulative particle size distribution of the multi-element cathode material satisfies 1 μm≤$D_1$≤2 μm;
   the arithmetic average roughness Ra, measured with the three-dimensional scanning electron microscope, of the coating of the multi-element cathode material satisfies 30 nm≤Ra≤100 nm; and
   the coverage Q of the dot-like coating and/or the island-like coating of the multi-element cathode material satisfies 5%≤Q≤15%.

3. The multi-element cathode material according to claim 1, wherein a particle diameter $D_{50}$ with 50% cumulative particle size distribution of the multi-element cathode material ranges from 2 μm to 8 μm.

4. The multi-element cathode material according to claim 1, wherein an average size $P_{50}$ of primary particles, measured with a Scanning Electron Microscope (SEM), of the multi-element cathode material ranges from 0.8 μm to 6 μm, and preferably, from 1 μm to 4 μm; and a specific surface area S of the multi-element cathode material satisfies: $0.2 \text{ m}^2/\text{g} \leq S \leq 1.2 \text{ m}^2/\text{g}$, and/or $1/P_{50}-0.1 \leq S \leq 1/P_{50}+0.2$.

5. The multi-element cathode material according to claim 1, wherein the multi-element cathode material is particles of a spherical shape and/or an ellipsoidal shape.

6. A method for preparing the multi-element cathode material according to claim 1, the method comprising:

(1) mixing a multi-element cathode material precursor, a first lithium source, and an optional dopant, and performing first high-temperature sintering on the mixture, to obtain a multi-element cathode material process product 1;

(2) coarsely crushing the multi-element cathode material process product 1, and sequentially performing acid solution rinsing, water rinsing, and drying on the coarsely crushed multi-element cathode material process product 1, to obtain a multi-element cathode material process product 2; and (3) mixing the multi-element cathode material process product 2, an optional second lithium source, and a coating agent, and performing second high-temperature sintering and sieving on the mixture, to obtain the multi-element cathode material; wherein:

conditions of the acid solution rinsing comprise: a concentration of an acid solution ranging from 0.01 g/mL to 0.05 g/mL, and a rinsing duration ranging from 1 second to 120 seconds;

a sintering temperature $T_2$ of the second high-temperature sintering ranges from 200° C. to 1,000° C.;

a matrix of the multi-element cathode material has a composition represented by a formula I:

$$\text{Li}_a\text{Ni}_x\text{Mn}_y\text{Co}_z\text{M}_b\text{O}_2 \qquad \text{the formula I,}$$

where $0.9 \leq a \leq 1.1$, $0.5 \leq x < 1$, $0 < y < 0.5$, $0 < z < 0.5$, and $0 \leq b \leq 0.02$; a coating of the multi-element cathode material comprises a lithium oxide compound containing an element J and/or an oxide containing the element J, and an amount of the coating agent is added based on a stoichiometric ratio of $0 < [n(J)]/[n(Ni)+n(Co)+n(Mn)] \leq 0.03$.

7. The method according to claim 6, wherein the multi-element cathode material precursor is a ternary nickel-cobalt-manganese cathode material precursor.

8. The method according to claim 7, wherein a total amount of the first lithium source and the second lithium source is added based on a stoichiometric ratio of $0.9 \leq [n(\text{Li}_1)+n(\text{Li}_2)]/[n(Ni)+n(Co)+n(Mn)] \leq 1.1$.

9. The method according to claim 7, wherein:

an amount of the dopant is added based on a stoichiometric ratio of $0.0001 \leq [n(M)]/[n(Ni)+n(Co)+n(Mn)] \leq 0.02$; and the amount of the coating agent is added based on a stoichiometric ratio of $0.001 \leq [n(J)]/[n(Ni)+n(Co)+n(Mn)] \leq 0.01$.

10. The method according to claim 6, wherein conditions of first high-temperature sintering comprise: a sintering temperature $T_1$ ranging from 700° C. to 1,200° C., a sintering duration ranging from 10 hours to 30 hours, and a sintering atmosphere of oxygen and/or air.

11. The method according to claim 6, wherein the sintering temperature $T_2$ of the second high-temperature sintering ranges from 200° C. to 1,000° C., and the sintering temperature $T_2$ and a melting point $T_m$ of the coating agent satisfy a relation of $100 \times \ln T_m - 200 \leq T_2 \leq 100 \times \ln T_m + 100$.

12. The method according to claim 11, wherein the sintering temperature $T_2$ of the second high-temperature sintering ranges from 300° C. to 900° C., and the sintering temperature $T_2$ and the melting point $T_m$ of the coating agent satisfy a relation of $100 \times \ln T_m - 100 \leq T_2 \leq 100 \times \ln T_m + 50$.

13. The method according to claim 6, wherein:

the first lithium source and the second lithium source are each independently selected from one of lithium carbonate, lithium hydroxide, lithium oxide compound, and lithium acetate;

the dopant and the coating agent are each independently selected from one of carbonates, hydroxides, oxides, and acetates capable of providing at least one element of Ba, Ra, Zr, Fe, Ca, Zn, B, W, Nb, Cd, Pb, Si, Mo, Cu, V, Ta, Cr, La, Al, Ce, Er, Ho, Y, Mg, Sr, and Ti; and the acid solution is selected from at least one of sulfuric acid, carbonic acid, acetic acid, and oxalic acid.

14. The method according to claim 6, wherein the conditions of the acid solution rinsing comprise: the concentration of the acid solution ranging from 0.02 g/mL to 0.04 g/mL, and the rinsing duration ranging from 5 seconds to 60 seconds;

the sintering temperature $T_2$ of the second high-temperature sintering ranges from 300° C. to 900° C.;

a sintering duration of the second high-temperature sintering ranges from 5 hours to 20 hours; and the second high-temperature sintering is performed in air and/or oxygen.

15. A lithium ion battery, comprising a multi-element cathode material, wherein:

a surface of the multi-element cathode material comprises a dot-like coating and/or an island-like coating;

a particle diameter $D_1$ with 1% cumulative particle size distribution of the multi-element cathode material is greater than or equal to 0.7 μm;

an arithmetic average roughness Ra, measured with a three-dimensional scanning electron microscope, of the coating of the multi-element cathode material satisfies 20 nm ≤ Ra ≤ 200 nm; and a coverage Q of the dot-like coating and/or the island-like coating of the multi-element cathode material satisfies 3% ≤ Q ≤ 30%, a matrix of the cathode material has a composition represented by a formula I:

$$\text{Li}_a\text{Ni}_x\text{Mn}_y\text{Co}_z\text{M}_b\text{O}_2 \qquad \text{the formula I,}$$

where $0.9 \leq a \leq 1.1$, $0.5 < x < 1$, $0 < y < 0.5$, $0 < z < 0.5$, and $0 \leq b \leq 0.02$;

the coating comprises a lithium oxide compound containing an element J and/or an oxide containing the element J;

wherein contents of the matrix and the coating enable the cathode material to satisfy $0 < [n(J)]/[n(Ni)+n(Co)+n(Mn)] < 0.03$; and wherein M and J are each independently selected from at least one element of Ba, Ra, Zr, Fe, Ca, Zn, B, W, Nb, Cd, Pb, Si, Mo, Cu, V, Ta, Cr, La, Al, Ce, Er, Ho, Y, Mg, Sr, and Ti.

16. The lithium ion battery according to claim 15, wherein:

the particle diameter $D_1$ with 1% cumulative particle size distribution of the multi-element cathode material satisfies 1 μm ≤ $D_1$ ≤ 2 μm;

the arithmetic average roughness Ra, measured with the three-dimensional scanning electron microscope, of the coating of the multi-element cathode material satisfies 30 nm≤Ra≤100 nm; and the coverage Q of the dot-like coating and/or the island-like coating of the multi-element cathode material satisfies 5%≤Q≤15%.

17. The lithium ion battery according to claim 15, wherein a particle diameter $D_{50}$ with 50% cumulative particle size distribution of the multi-element cathode material ranges from 2 μm to 8 μm, and preferably, from 2.5 μm to 7 μm;

preferably, an average size $P_{50}$ of primary particles, measured with a Scanning Electron Microscope (SEM), of the multi-element cathode material ranges from 0.8 μm to 6 μm, and preferably, from 1 μm to 4 μm;

preferably, a specific surface area S of the multi-element cathode material satisfies: 0.2 m²/g≤S≤1.2 m²/g, and/or $1/P_{50}-0.1 \leq S \leq 1/P_{50}+0.2$; and preferably, the multi-element cathode material is particles of a spherical shape and/or an ellipsoidal shape.

* * * * *